United States Patent [19]

Daab et al.

[11] 4,011,490

[45] Mar. 8, 1977

[54] APPARATUS FOR IMMOBILIZING A WORKING SHAFT AT A PREDETERMINED ANGULAR POSITION

[76] Inventors: Heinz Daab, Heppelstrasse 46, Darmstadt-Arheilgen; Bernd Scheider, Ostpreussenstrasse 25, Darmstadt-Eberstadt, both of Germany, 6100

[22] Filed: Mar. 26, 1975

[21] Appl. No.: 562,104

[30] Foreign Application Priority Data

Mar. 29, 1974 Germany .......................... 2415359

[52] U.S. Cl. ................................. 318/269; 318/467
[51] Int. Cl.² ........................................... G05B 5/01
[58] Field of Search .......... 318/264, 265, 269, 275, 318/466, 467, 612, 615–617, 619

[56] References Cited

UNITED STATES PATENTS

| | | | |
|---|---|---|---|
| 3,532,953 | 10/1970 | Daab et al. | 318/467 |
| 3,860,860 | 1/1975 | Moran et al. | 318/269 X |
| 3,872,365 | 3/1975 | Vignaud et al. | 318/265 |
| 3,904,890 | 9/1975 | Wenrich et al. | 318/467 X |

Primary Examiner—Robert K. Schaefer
Assistant Examiner—W. E. Duncanson, Jr.
Attorney, Agent, or Firm—Lane, Aitken, Dunner & Ziems

[57] ABSTRACT

A positioning drive with an electronic regulator for controlling the r.p.m. of a working shaft has a regeneratively coupled amplifier with variable negative feedback adjustable from a normally high value to a minimum value for the final braking action, whereby the shaft is abruptly brought to rest at a predetermined angular position.

13 Claims, 6 Drawing Figures

APPARATUS FOR IMMOBILIZING A WORKING SHAFT AT A PREDETERMINED ANGULAR POSITION

BACKGROUND OF THE INVENTION

The invention relates to apparatus for immobilizing a working shaft at a predetermined angular position, and concerns apparatus comprising an electric clutch motor whereof the coupling member which is transmissively connected to the working shaft may be coupled electromagnetically to a constantly driven main driving spindle of the clutch motor and/or to a braking abutment, for the purpose of driving the working shaft at a preset working speed of revolution under the action of a regulator affected by the controlling difference between the actual speed of revolution measured and the preset speed of revolution.

In the case of positioning drives of this nature, the working shaft, the speed of revolution of which is governed during operation, is braked upon initiation of the immobilizing action from the working speed of revolution to a preset and relatively low switch-off r.p.m. and then kept at the switch-off r.p.m. by the regulator until an element, being a so-called synchronizer, which is transmissively coupled to the working shaft, comes into action and initiates the final braking operation from the switch-off r.p.m. to zero.

Known positioning drives (e.g. DT-AS 1,291,014 = GB-PS 1,150,932, and DT-AS 1,613,350) which operate on the principle defined in the foregoing, either lack of satisfactory quality of control (i.e. and excessive stoppage period and/or inadequate stopping precision), or are relatively costly and consequently of limited application.

The invention is based on the problem of devising a positioning drive which renders it possible to obtain a high quality of control and low cost.

SUMMARY OF THE INVENTION

In accordance with the invention, this problem is resolved in that the regulator has a regeneratively coupled control amplifier having a variable degree of feedback adjustable to a minimum value for the final braking action. The degree of negative feedback of the control amplifier is relatively high during operation at the governed speed of revolution. This prevents undesirable hunting of the governing action. Provision is made for rapid matching of the control quantity. Since the brake only is switched on during the final braking action, periodicity is of no consequence. By reducing the degree of negative feedback for the final braking action, it is ensured that the brake is fully energized in the shortest possible time and that the final braking action is thereby concluded particularly quickly.

A regeneratively coupled transistor whereof the feedback may be switched adjunctively and disjunctively via a control transistor stage, is appropriately incorporated as a control amplifier.

At the same time the control transistor stage preferably serves the purpose of evaluating the angular measurement signals of the synchronizer; for this purpose, its input side is connected directly to the synchronizer determining the scheduled stopping position. The latter may simply comprise one or more slip rings having a point of interruption.

An a.c. generator, for example, a standard tachogenerator or an inductive transmitter, for example as known from DT-AS 2,134,751, comprising an end rectifier and a filter element, is appropriate as an actual r.p.m. value meter. In a case of this nature, the filter element is so arranged that a direct voltage with a superimposed alternating voltage is present at the output side of the actual r.p.m. value meter, the amplitude of the d.c. component concomitantly being a function of the r.p.m. preferably being proportional to the r.p.m.

For further simplification of the circuitry, the control amplifier is preferably preceded by a voltage divider acting as a comparator stage, which on the one hand may receive an actual speed (r.p.m.) value voltage from the actual r.p.m. value meter and on the other hand a datum voltage dependent on the angle of rotation, from the control transistor stage. The nominal speed (r.p.m.) value may appropraitely be adjusted by varying the dividing ratio of the voltage divider. This may be performed continuously or in steps, to which end individual resistors of the voltage divider may be short-circuited, preferably, in the last-mentioned case for transmission of the nominal r.p.m. value.

A timing element which after a predetermined period automatically releases the brake following the stopping of the drive and locks the clutch, is preferably complementarily coupled to the transistor control stage.

So that the wear of the clutch and brake linings as well as the generation of heat may be kept low, provision is made in another embodiment of the invention that the braking and control amplifiers can never be actuated at the same time but only alternately. This may be accomplished simply by connecting one of the amplifiers to the control amplifier via a threshold value circuit. The threshold value circuit ensures that — in the different switching conditions — the clutch is isolated from the brake and conversely the brake from the clutch. The braking amplifier is appropriately coupled to the control amplifier via a Zener diode forming the threshold value circuit.

For a further reduction of the production costs, the coupling and braking amplifiers are analogously designed and one of the amplifiers is preceded by an inverter.

BRIEF DESCRIPTION OF THE DRAWINGS

The invention will now be described solely by way of example with reference to the accompanying drawings, in which.

DESCRIPTION OF THE PREFERRED EMBODIMENTS

Figure 1:
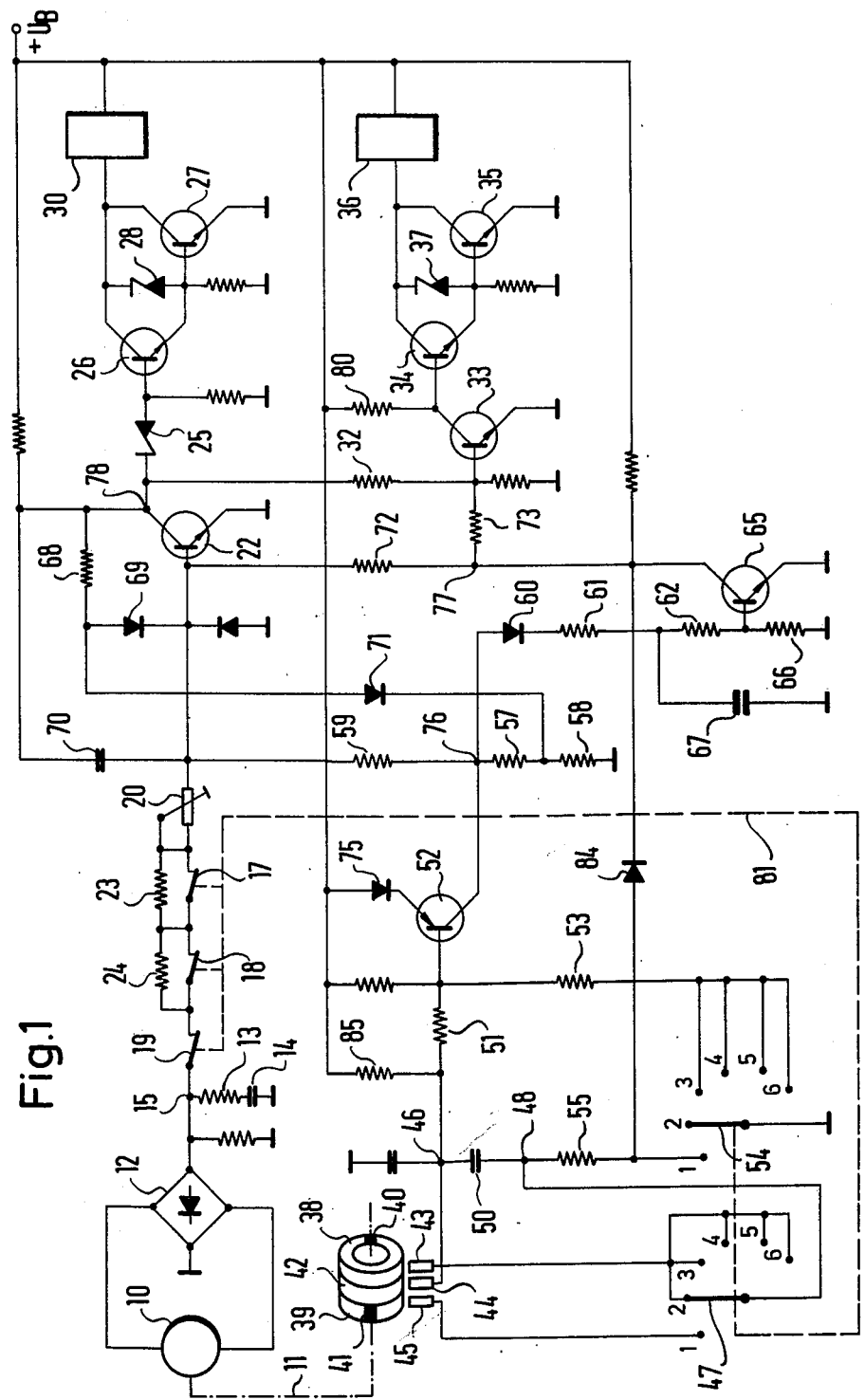
FIG. 1 is a schematic circuit diagram of an embodiment according to the invention.
Figure 2A:
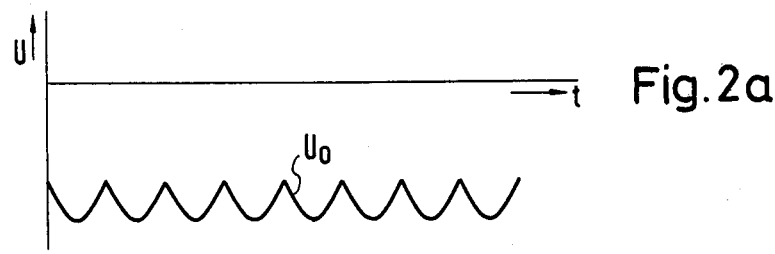
FIGS. 2a, 2b, 2c and 2d are graphs illustrating different signals appearing in the circuit system according to FIG. 1, as a function of time.
Figure 2B:

The circuit system according to FIG. 1 comprises an alternating voltage transmitter 10 which may actually be situated on the output spindle of a clutch motor or on a working shaft indicated diagrammatically by a broken line 11. The transmitter 10 delivers an alternating voltage having an amplitude and frequency proportional to the actual rotational speed (r.p.m.) of the spindle or shaft to a bridge rectifier 12 which converts the output signal of the transmitter 10 into a pulsating negative direct voltage. A filter circuit comprising a resistor 13 and capacitor 14 filters a part of the alternating voltage component out of the pulsating direct voltage. Consequently, an actual r.p.m. signal in the form of a negative direct voltage having a superimposed alternating voltage component, appears at the point 15. This signal, $U_o$, is illustrated diagrammatically in FIG. 2a.

The output side of the bride rectifier 12 is connected to the base of a control amplifier transistor 22 via a multi-contact switch or control board comprising contacts 17, 18, 19 and a variable resistor 20. Biasing resistors 23, and 24, respectively, are arranged in parallel with the contacts 17 and 18 respectively. The collector of the transistor 22 is connected via a Zener diode 25 to the base of a transistor 26 which has its emitter connected to the base of a transistor 27 and its collector connected to the collector of transistor 27. The transistors 26, 27 form a braking amplifier. A Zener diode 28 is arranged parallel to the collector-emitter junction of the transistor 26. A winding 30 of an electromagnetically actuated brake of the clutch motor is situated in the collector circuit of the transistor 27. The base of a transistor 33 which precedes transistors 34 and 35, is connected to the collector of the transistor 22 via a biasing resistor 32. The clutch winding 36 of the clutch motor is situated in the output circuit of the power transistor 35. A Zener diode 37 is connected in parallel with the collector-emitter junction of the transistor 34. The transistors 34, 35 form the clutch amplifier constructed analogously to the braking amplifier. The transistor 33 inverts the output signal of the control amplifier transistor 22, fed to the clutch amplifier.

An angular position transmitter which indicates the position or positions at which the drive should be stopped, is situated on the working shaft 11, and is referred to as a synchronizer. In the embodiment illustrated, the synchronizer is equipped with electrically conductive slip rings 38, 39, each of which comprises an electrically-insulating interruption point 40, 41 corresponding to a stopping position. A third continuously electrically-conductive slip ring 42 is situated between the slip rings 38, 39. Brushes 43, 44 and 45 respectively co-operate with each of the slip rings 38, 39, 42. The brush 44 is connected to a point 46, the brush 43 is connected to contacts corresponding to switching positions 2, 3, 4, 5 and 6 of a pedal-operated switch 41, and the brush 45 to the contact corresponding to switching position 1 of the switch 47. The contact arm of the switch 47 is connected to a point 48. A capacitor 50 is connected via a resistor 51 to the base of a transistor 52 which is complementarily connected via a resistor 53 to the contacts of a pedal-operated switch 54 corresponding to the switching positions 3, 4, 5 and 6. As shown, the switches 47 and 54 are mechanically connected to each other and to the step switch 17, 18, 19. The point 48 is connected via a resistor 55 to the contact of the pedal-operated switch 54 corresponding to the switching position 1. The collector the transistor 52 is connected to earth via resistors 57, 58, to the base of the transistor 22 via a resistor 59, as well as via a diode 60 and resistors 61, 62 in series to the base of another transistor 65. The base of the transistor 65 is also connected to earth, via a resistor 66. A capacitor 67 is connected in parallel with the series circuit consisting of the resistors 62 and 66.

The collector of the transistor 22 is connected to its base via a resistor 68 and a diode 69 on the one hand, and via a capacitor 70 on the other hand. The junction point of connection of the resistor 68 and diode 69 is connected via a diode 71 to the junction point of connection of the resistors 57, 58. The base of the transistor 22 is connected moreover via a resistor 72 to the collector of the transistor 65 which, for its part, is connected via a resistor 73 to the base of the transistor 33.

Figure 3:
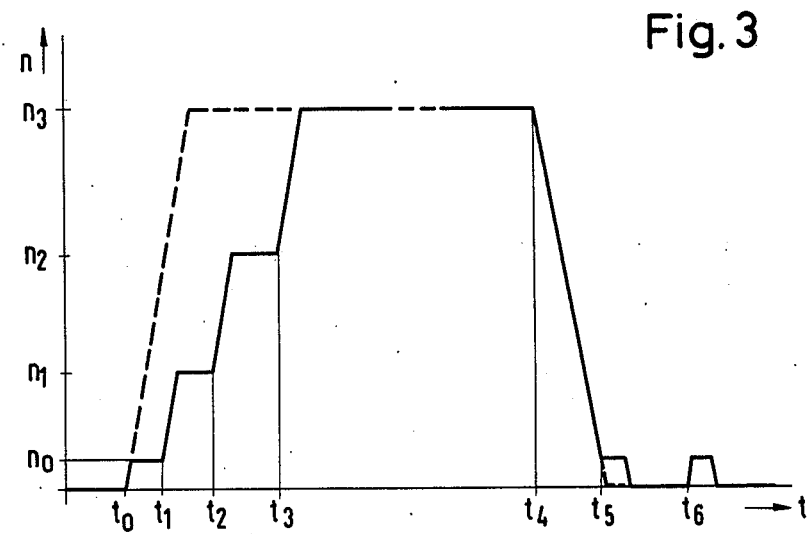
FIG. 3 is a graph illustrating typical speeds of rotation (r.p.m.) characteristic of the positioning drive.

The circuit system according to FIG. 1 operates as follows. To run-up the drive from the stopped condition, the pedal switches 41 and 54 are changed from the idle position (switching position 2) to the switching position 3 (this corresponds to instant $t_o$ in FIG. 3). One slip ring 38 is energized via the switch 47. Base current is fed into the transistor 52 via the resistor 53 and the transistor 52 is unblocked. Positive potential from the terminal $+U_B$ is thereby caused to appear at the base of the transistor 22, via a diode 75, the transistor 52 and the resistor 59. Because the potential at the point of connection 76 of the resistors 57 and 59 connected to the collector of the transistor 52 becomes positive, charging of the capacitor 67 occurs via the diode 60 and the resistor 61. The transistor 65 is switched over at the same time, via the resistor 62. The point of connection 77 of the resistors 72 and 73 acquires earth potential and the clutch previously locked via the resistor 73 is released thereby.

At this instant, the transmitter 10 does not supply any signal, since the working shaft 10 still stands idle for the time being. Current is fed into the base of the transistor 22 via the resistor 59 and the transistor 22 is switched-over. The potential thus drops at the point 78, connected to the collector of this transistor, with the result that the transistor 33 is blocked via the resistor 32. The base of the transistor 44 is connected to a high potential $U_B$ via a resistor 80. The transistor 34 becomes conductive and current is thereby fed into the base of the power transistor 35 and this transistor is switched over. Current flows through the clutch winding 36 and the clutch is engaged.

The Zener diode 25 as well as the transistors 26 and 27 remain blocked in view of the low voltage at the point 78 so that the brake is switched-off.

The working shaft is run-up through the clutch. At the switching position 3 of the switches 47, 54, the contacts 17, 18 and 19 are closed via the mechanical linkage shown as a broken line 81. The working shaft is accelerated up to a low initial rotational speed (r.p.m. stage) the (the switch-off r.p.m., $n_o$), which is determined by the control resistor 20. As soon as the negative voltage ($U_o$ in FIG. 2a), coming from the bridge rectifier 11 and attenuated in predetermined manner via the control resistor 20, overcomes the action of the positive voltage fed to the base of the transistor 22 via the transistor 52 and the resistor 59 (instant $t_1$ in FIG. 3), the transistor 22 is blocked. The voltage rises at the point 78 and the transistor 33 is switched-over via the resistor 32. The transistors 34 and 35 are then blocked and the clutch winding 36 is de-energized. As soon as the threshold value voltage predetermined by the Zener diode 25 is exceeded, the transistors 26 and 27 are switched-over and the brake winding 30 is energized.

Figure 2C:
Figure 2D:

Because of the alternating voltage component superimposed on the negative direct voltage component of the actual r.p.m. value signal, the brake and clutch are subsequently energized and de-energized alternatively, the cadence rate depending on the magnitude of the load and the preset rated r.p.m. (control resistor 20). This is shown diagrammatically in FIGS. 2b, 2c and 2d. FIG. 2 shows the voltage at the input terminal of the control amplifier transistor 22. The abscissa is concomitantly plotted for the value of the switching potential at which the transistor 22 is switched-over. The control voltage at the base of the transistor 34 is shown in FIG. 2c, and the control voltage at the base of the transistor 26, which is substantially complementary thereto, is shown in FIG. 2d.

If the switches 47, 54 are moved from the switching position 3 into the switching positions 4, 5 and 6, the contacts 17, 18 and 19 are opened consecutively. The short-circuiting of the series resistor 23 is cancelled at the switching position 4 by the opening of the contact 17 (instant $t_1$ in FIG. 3). This has the consequence that, in view of the changed voltage divider ratio (resistors 20, 23, 57, 58 and 59), the negative actual r.p.m. value signal undergoes greater attenuation. The positive bias voltage which is imposed on the base of the transistor 22 via the switched-over transistor 52 and the resistor 59, consequently prevails initially. The drive is thus accelerated to the next higher r.p.m. stage $n_1$ and maintained therein by the alternate operation of the clutch and brake. A change to an even higher governed r.p.m. stage $n_2$ occurs in corresponding manner, if the switches 47, 54 are moved to the switching position 5 and the contact 18 is opened complementarily to the contact 17 (instant $t_2$). The contact 19 is finally opened (instant $t_3$) at the switching position 6 of the contactors 47, 54. The actual r.p.m. value signal is thereby cut-off from the input side of the control amplifier transistor 22. Curent is fed continuously to the base of the transistor 22 via the transistor 52 and the resistor 72. The clutch winding 30 is constantly energized. The drive runs at maximum r.p.m., $n_3$, without being governed, when the clutch is constantly engaged.

It is evident that the switches 47, 54 may also, for example, be moved direct from the switching position 2 to the switching position 6. The rotation speed of the shaft (r.p.m.) then rises evenly in the manner shown by a broken line in FIG. 3, from zero to the maximum r.p.m.

If the drive should then be stopped at the position determined by the point of interruption 40, the pedal swtiches 47, 52 are moved to the switching position 2 (instant $t_4$ in FIG. 3), the contacts 17, 18 and 19 being closed at the same time via the mechanical linkage 81. Despite the opening of the switch 54, the base current of the transistor 52 initially continues to flow via the resistor 51, the brush 44, the slip ring 42, the slip ring 38 connected to the former in electrically conductive manner, the brush 43, the switch 47, the resistor 55, a diode 84 and the switched-over transistor 65.

In view of the actual r.p.m., which is initially still high, the negative actual r.p.m. signal coming from the transmitter 10 prevails at the base of the transistor 22 and the transistor 22 is blocked. The transistor 33 is switched-over and in turn blocks the transistors 34 and 35. The clutch winding 36 is de-energized. The striking or breakdown voltage of the Zener diode 25 is exceeded. Current is fed to the base of the transistor 26 and the transistors 26 and 27 are switched-over. The brake winding 30 is thus energized. The drive is braked until the shaft speed is reduced to the switch-off r.p.m. predetermined by the control resistor 20. As soon as the brush 43 reaches the point of interruption 40, the transistor 52 is blocked. The voltage drops at the point 76 and the transistor 22 is blocked. The voltage at the point 78 shifts towards the potential $+U_B$ and the transistor 33 is switched-over. The transistors 34 and 35 are blocked as a result and the clutch winding 36 is de-energized. The transistors 26 and 27 are switched-over. Current flows through the brake winding 30, the brake is applied and the drive is braked down to a stop.

The charging current circuit of the capacitor 67, through the diode 75, the transistor 52, the diode 60 and the resistor 61, is interrupted by the blocking of the transistor 52. The capacitor 67 is discharged via the resistors 62 and 66, the transistor 65 thereby initially being kept in the switched-over condition. After a period determined by the time constant of the RC circuit 62, 66, 67, for example after 200m secs, the capacitor 67 is discharged to such a degree that the transistor 65 is blocked. The transistor 22 is switched over via the resistor 72, thereby switching off the brake. Re-energization of the clutch via the resistor 73 is prevented whilst the transistor 65 is blocked. The drive is then stopped at the one scheduled stopping position preset by the slip ring 38 and the brake is released.

If it is intended to change over from the first stopping position, for example the "needle down" position in the case of a sewing machine, the second stopping position — for example the "needle up" position — the switches 47 and 54 are moved to the switching position 1 (instant $t_6$ in FIG. 3) at which the contacts 17, 18 and 19 remain closed. Base current is fed to the transistor 52 via a circuit extending from earth via the switch 54, the resistor 55, the switch 47, the brush 45, the conductive portion of the slip ring 39, the slip ring 42 conductively connected to the former, the brush 44 and the resistor 51, to the base of the transistor 52, and the transistor 52 is switched over. The voltage at the point 76 shifts toward the potential $+U_B$. Base current is fed to the transistor 65 via the diode 60 and the resistors 61, 62 and the transistor 65 is switched-over. The point 77 tends towards earth potential. The clutch is released thereby. Base current reaches the transistor 22 via the resistor 59. The point 78 tends towards earth potential and the transistor 33 is blocked via the resistor 32. The transistors 34 and 35 are energized and the clutch winding 36 is thus energized. The drive starts up and is accelerated to the positioning r.p.m., $n_o$ determined by the control resistor 20. The base current circuit of the transistor 52 is interrupted by the point of interruption 41 after a rotation of the working shaft 11 of almost 180°. The drive is stopped in the manner described in the foregoing with respect to the first stopping position. The negative feedback led via the resistor 68 and the diode 69 from the collector to the base of the control amplifier transistor 68 and the diode 69 from the collector to the base of the control amplifier transistor 22 remains effective for as long as the transistor 52 is switched-over and the point 76 is at position voltage. But as soon as the transistor 52 is blocked and the voltage drops at the point 76, the diode 71 is forward-biased into conduction, via the voltage divider 57, 58. The feedback voltage dropped across the resistor 68 is consequently drained off via the diode 71. The feedback signal does not therefore make itself felt at the base of the transistor 22. This means that the blocking of the control amplifier transistor 22, initiated by the blocking of the transistor 52 and intended for the final braking action, occurs rapidly whereas the blocking of the transistor 22 occurring within the scope of the speed (r.p.m.) governing operation happens more slowly in view of the negative feedback. It is thereby possible in an uncomplicated manner to prevent undesirable control fluctuations, and provision may equally be made for a very rapid immobilization of the drive based on the switch-off command transmitted by the synchronizer.

What we claim is:

1. Apparatus for immobilizing a shaft at a predetermined angular position, comprising an electric clutch motor whereof the clutch element transmissively coupled to the working shaft may be connected to a continuously driven main driving spindle of the clutch motor and/or to a braking member by the action of regulator operatively controlled by the difference between the actual speed of revolution and a predetermined nominal speed of revolution, to drive the working shaft substantially at a predetermined working speed of revolution, wherein the improvement comprises:

said regulator having a regeneratively coupled control amplifier having means connected between the input and output thereof for generating a variable degree of negative feedback, and means for adjusting said feedback to a minimum value for the final braking action.

2. Apparatus according to claim 1, further comprising a control transistor stage, said control amplifier including a regeneratively coupled transistor having negative feedback and means for adjunctively and disjunctively switching said feedback via a control transistor stage.

3. Apparatus according to claim 2, further comprising a synchronizer, the input side of said control transistor stage being connected to said synchronizer for determining the scheduled stopping position.

4. Apparatus according to claim 3, in which said synchronizer comprises one or more slip rings having a point of interruption.

5. Apparatus according to claim 1, wherein said improvement further comprises means for indicating the speed of revolution of the shaft including an alternating voltage transmitter comprising a rectifier and filter circuit.

6. Apparatus according to claim 5, in which the filter circuit includes means for producing the output of the actual speed of revolution value meter as a direct voltage with a superimposed alternating voltage, the amplitude of the direct voltage component being a function of the speed of revolution.

7. Apparatus according to claim 5, in which the control amplifier is preceded by a voltage divider acting as a comparator stage connected to receive a signal having a value depending on the actual speed of revolution from the actual speed of revolution indicating means and a datum signal dependent on the angle of rotation from the control transistor stage.

8. Apparatus according to claim 7, in which the dividing ratio of the said voltage divider is variable to preset a nominal speed of revolution value.

9. Apparatus according to claim 8, in which said voltage divider includes individual resistors and means for short-circuiting said resistors for presetting the nominal speed of revolution value.

10. Apparatus according to claim 1, in which the transistor control stage has connected to it timing circuit means for causing automatic release of the brake, after a predetermined period, following the stopping of the drive, and locking of the clutch.

11. Apparatus according to claim 1, in which the braking member is connected to said control amplifier via a threshold value circuit.

12. Apparatus according to claim 1, in which the braking member includes an amplifier coupled to said control amplifier via a Zener diode as a threshold detector.

13. An electronic control system for a positioning drive for a rotating shaft, comprising means for producing a control signal indicative of r.p.m. of the shaft, a control amplifier operatively receiving said control signal and having a variable feedback circuit connected between the input and output thereof, a shaft clutch winding, an electromagnetic brake winding, a braking amplifier operatively connected between said brake winding and said control amplifier, a clutch amplifier substantially symmetrical to said braking amplifier operatively connected between said clutch winding and said control amplifier, signal inverting means interconnected between said control and clutch amplifiers, and means connected to said feedback circuit for automatically switching the level of feedback to a minimum value for final energization of said brake winding.

* * * * *